United States Patent [19]

Hosaka

[11] 3,958,968

[45] May 25, 1976

[54] ICE CREAM FREEZER

[76] Inventor: Yoshisada Hosaka, 13-14, Matsugaya 2, Taitoh, Tokyo, Japan

[22] Filed: Mar. 28, 1974

[21] Appl. No.: 455,550

[52] U.S. Cl. .................................. 62/343; 62/354; 259/DIG. 34; 259/43
[51] Int. Cl.² .......................................... A23G 9/12
[58] Field of Search ..................... 62/342, 343, 354; 259/DIG. 34, 43, 44; 165/94

[56] References Cited
UNITED STATES PATENTS

| | | | |
|---|---|---|---|
| 2,021,153 | 11/1935 | Sawyer | 259/DIG. 34 |
| 2,263,794 | 11/1941 | Wyen | 62/342 X |
| 2,266,766 | 12/1941 | Knight | 62/342 X |
| 2,557,813 | 6/1951 | Burton | 62/342 X |
| 3,138,008 | 6/1964 | Thompson | 62/342 X |
| 3,456,540 | 9/1969 | Carpigiani | 259/DIG. 34 |
| 3,465,540 | 9/1969 | Carpigiani | 259/DIG. 34 |

*Primary Examiner*—William E. Wayner
*Assistant Examiner*—William E. Tapolcai, Jr.
*Attorney, Agent, or Firm*—Olsen and Stephenson

[57] ABSTRACT

An ice cream making apparatus improved in that the refrigerated cylindrical container has a product outlet at its bottom portion for hygienic removal of the product ice cream and for ease of the operation, and in that the revolving blade assembly inside the container comprises essentialy a scraper member and a pusher member, which are coaxiallly driven from below the container and adapted to not only stir and mill intimately the stock solution or emulsion but also facilitate automatic removal of the product.

6 Claims, 6 Drawing Figures

ICE CREAM FREEZER

BACKGROUND OF THE INVENTION

This invention relates to an improved ice cream freezer. More particularly, it relates to an improved structure, in combination in an ice cream freezer, of the refrigerated container in which to prepare ice cream and the revolving blade assembly housed in the container.

It is an old art to manufacture ice cream by cooling with stirring the stock solution or emulsion in a cylinder suitably cooled from a refrigerator, and various ice cream making machines are available.

However, the current machines are defective in several points. For example, they employ stirrer blades which are driven to revolve from above the container, and with this structure it is unavoidable that the upper interior portion of the freezer is occupied by a blade driving mechanism so much that in order to there maintain a sufficient space to afford ease of the manual or other operation to be involved, the entire structure has to be undesirably large in scale.

Further, although ice cream freezers rely on scrapper blades for scraping downward such an ice cream portion as freezed to stick to the inner wall of the container, when the blades are revolved at a velocity above a certain value it takes place that such a portion of the stock solution or emulsion which is yet to be sufficiently freezed undergoes rising along the inner wall of the container due to the centrifugal force. With the scraper blades in the known freezers, it is observed that they cannot effectively check such rising of the semi-freezed portion of the stock, whereby milling of the stock and smoothing of the texture of ice cream cannot be sufficient; to limit the velocity of revolution of blades so as to suppress rise of the stock liquid accompanies the requirement for a longer production time and accordingly lowering of the quality and/or taste of the product ice cream.

A further difficulty with the current devices lies in that the product ice cream has to be taken out manually through an upper opening of the container, permitting ice cream to be touched by operator's hands. This of course is undesirable from the standpoint of food hygienics, and in addition, in view of the considerable time required for removing the product completely from the container, the operation for the product removal being greatly inconvenienced by the stirring blades and by the blade driving mechanism above the blades.

BRIEF SUMMARY OF THE INVENTION

It therefore is a primary object of this invention to provide an improved ice cream freezer with which the foregoing indicated difficulties with the current freezers can be effectively cancelled.

Another object of the invention is to provide revolving blades which are driven from below the container so that the freezer can have at its upper portion a full open space, free of any machine elements obstacle to operation.

A further object of the invention is to provide revolving blade stucture including scrapers capable of not only scraping off but also pressing downward the ice cream during the course of freezing.

A still further object of the invention is to provide a freezed container having a product outlet at its bottom, and a stirring blade structure including pusher blades.

The ice cream freezer of this invention is most essentially characterized in that it includes a multi-purpose revolving blade assembly which can perform stirring and milling of the stock solution or emulsion and, in addition, discharging of the product ice cream.

These and other objects, features and advantages of the invention will become apparent upon consideration of the following description of the preferred embodiment taken in conjunction with the accompanying drawings.

DESCRIPTION OF PREFERRED EMBODIMENT

Figure 1:
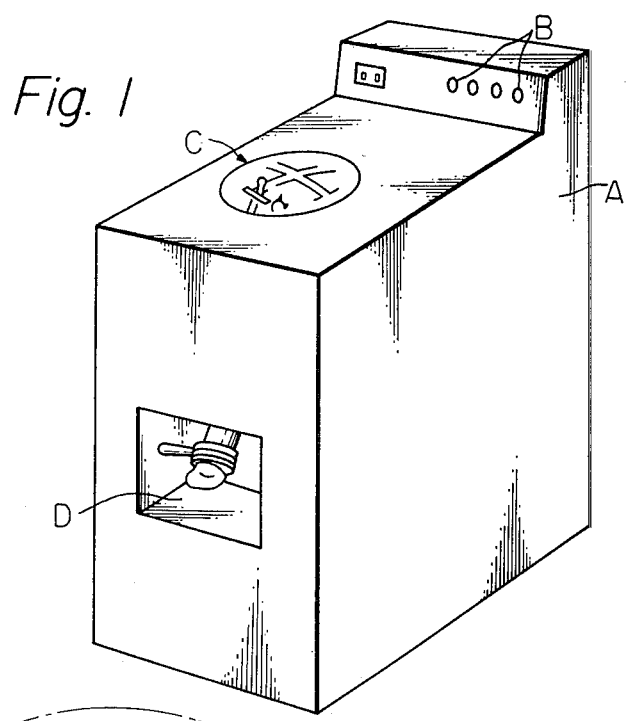
FIG. 1 is a perspective view of an ice cream freezer, embodying the concept of the present invention.

Referring to the drawings and FIG. 1 initially, the housing indicated at A therein receives a cylindrical container in which to prepare ice cream, a driving mechanism for a revolving blade assembly inside the container, a refrigeration mechanism for cooling the container, and so forth, and mounts at its upper portion switch buttons B. The cylindrical container indicated at C, of which the stock feed opening opens at an upper surface portion of the housing A, has a discharge opening D communicating to its bottom. The opening D, which opens at a side wall portion of the housing, is provided near its forward end with a suitable valve to be open for discharging ice cream.

As illustrated in detail in FIG. 2, the container C of which the outer wall is wound about with a cooling pipe P connected to a suitable refrigerator (not shown), therein receives a revolving blade assembly shown by a numeral 1, which includes a cylinder 2 internally supporting a rotation shaft 3 driven from below and extending upright through the center of the bottom of the container C, beyond the upper end of the cylinder 2. The support cylinder 2 rotatably supports at its top end an upper hub 5 of the blade assembly 1 through a bearing 2'. The blade assembly has a lower hub 6 co-axial with the uppr hub 5, which is closed by a threadably engaging cap 4.

Figure 3:
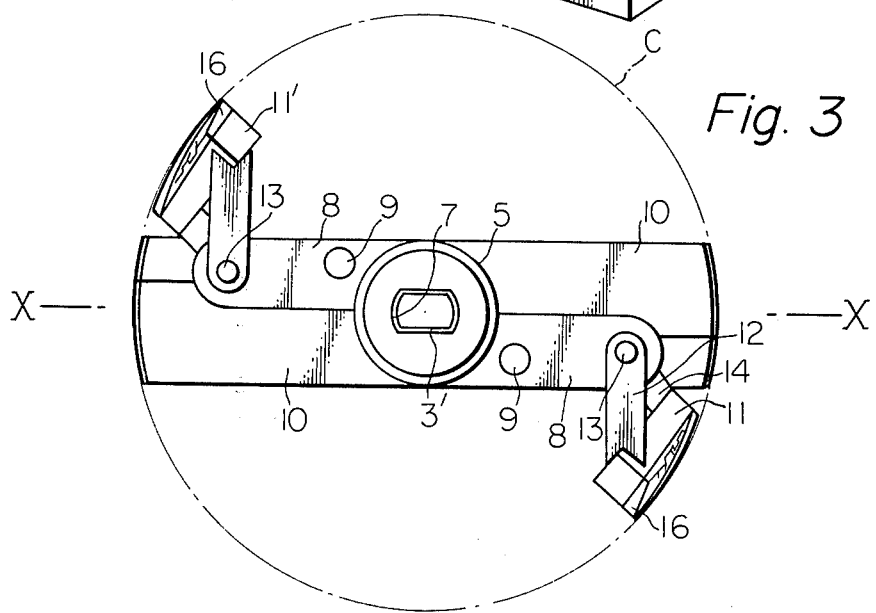
FIG. 3 is a top plan view of the revolving blade assembly of FIG. 2.

As shown in FIG. 3, the upper hub 5 is provided with an elongated slot 7, with which the top end 3' of the shaft 3 drivingly engages. The hub 5 further has a pair of horizontal arms 8, which are connected by stays 9 to a pair of pusher blades 10 horizontally extending from the lower hub. Between the outer end of each arm 8 and that of each pusher blade 10 there are provided scraper blades 11 and 11' suitably inclined with respect to the generating line of the cylinder C. The scrapers 11 and 11', of which the outer surface frictionally engages the inner wall of the container C, can be hingedly attached by upper links 12 to pins 13 on each horizontal arm 8 and by lower links 14 to pins 15 on each pusher blade 10.

Upper links 12 and lower links 14 are secured at different angles with respect to the scraper body and have different lengths, therefore the scraper members 11 and 11' can be disposed with inclination toward the direction of rotation, with respect to the generating line of the cylindrical container C as before mentioned, and therefore the scrapers can function to not only scrape off the ice cream portion freezed to stick to the inner wall of the container but also press down the semifreezed portion tending to come up along the container wall.

Figure 2:
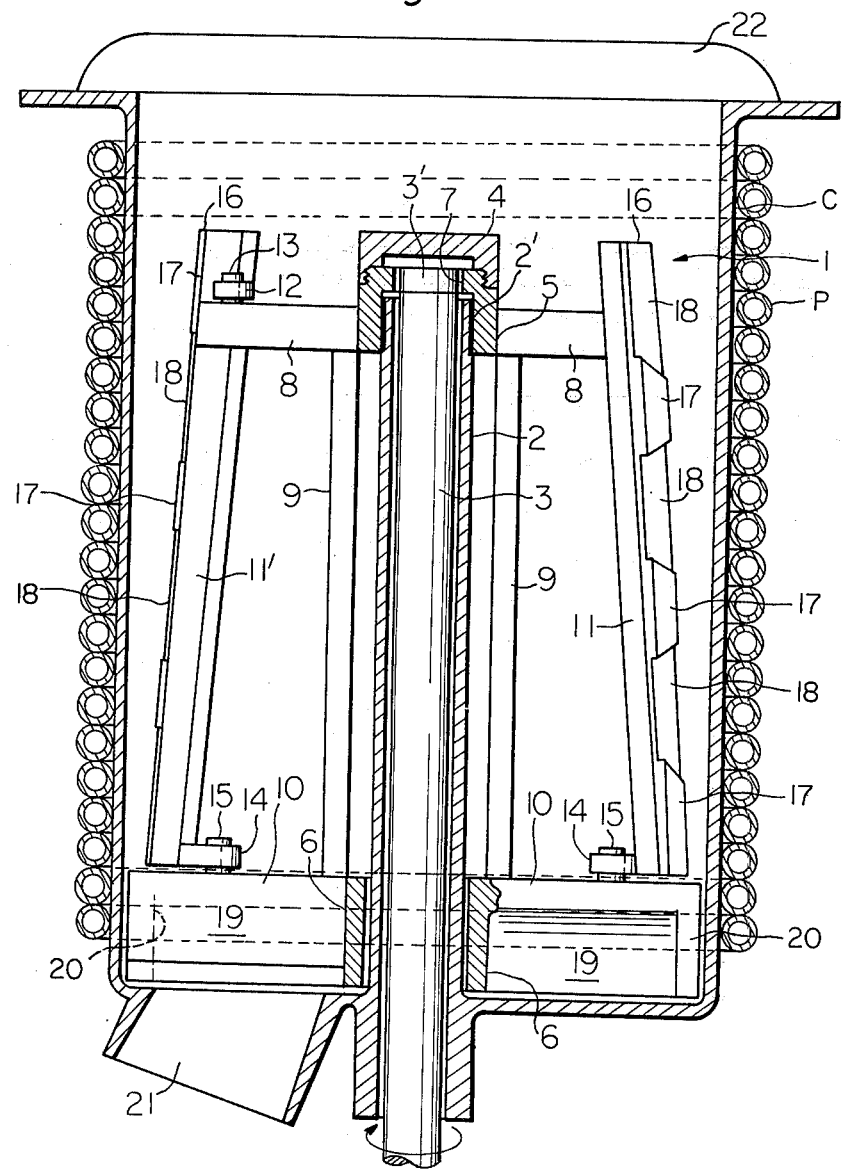
FIG. 2 is a longitudinal sectional view, taken on line X—X of FIG. 3 showing the refrigerated container and the inside revolving blade assembly, of the freezer of FIG. 1.
Figure 6:
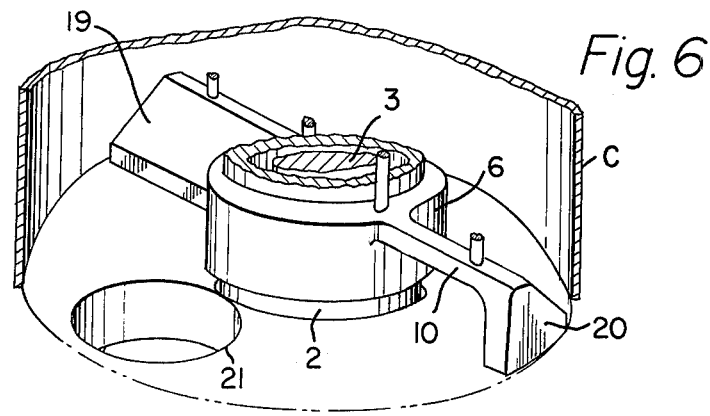
FIG. 6 is a perspective view, showing the structure and configuration of the pusher member of the blade assembly.
Figure 4:
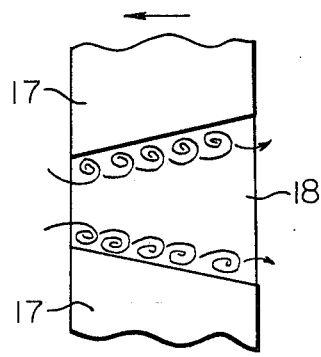
FIG. 4 is a fragmentary view of the scraper member of the blade assembly.

The outer surface or friction surface 16 of scrapers 11 and 11', which are to be of a material desirable in respect of both food hygienics and friction resistivity, for example, Teflon or the like, alternately forms land portions 17 and grooved portions 18, and the disposition of these land and groove portions is reversed with the scrapers 11 and 11' as illustrated in FIG. 2, whereby the freezed matters attached to the container wall can be completely scraped off and sent downward. Each groove portion 18, as shown in FIG. 4, has narrower leading edge and broader trailing edge in the direction of rotation indicated by an arrow. Therefore, the stock can be intimately milled along the side wall of the groove portions in a manner as depicted by eddies in FIG. 4. Also, this structure greatly contributes to create a swell in volume by whipping air into the ice cream.

Figure 5:
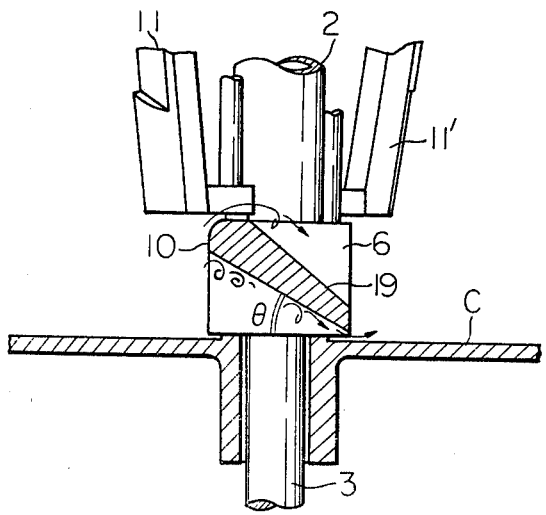
FIG. 5 is also a fragmentary view, illustrating a sectional configuration of the pusher member of the blade assembly.

Each pusher blade 10 consists of a wall 19 secured to the lower hub 6 and tilted toward the direction of rotation, and a perpendicular triangle wall 20 close to the container wall surface. As shown in FIG. 5, the tilt wall 19 should preferably have an aerofoil section. Whereas this wall 19 has an angle $\theta$ with respect to horizon, this angle has much to do with the effect of milling, and it has been observed that when the angle $\theta$ has a value in the order of 30° the milling can be performed with maximum desirable effect.

The ice cream freezer in accordance with the present invention is further characterized by the provision of a product outlet 21 at the bottom of the container C (FIG. 2). Preferably, this outlet should have a configuration expanding downward so as to effectively reduce the flow resistance of ice cream to minimize the time required for discharging ice cream. The outlet connects through a valve (not shown) to the discharge opening D at the side wall of the housing A.

The upper opening of the container C can be shut by a lid member 22, preferably of a transparent material.

In operation, the suitable one of the switch buttons B will be pressed to actuate the refrigerator. When the valve of the discharge opening 21 is closed, the prescribed amount of the stock solution or emulsion is charged into the container C. Then, a next button is pressed to put in operation an electric motor to drive the blade assembly 1 to revolve. The motor should preferably be of a variable speed type, and in accordance with the particular type of the motor to be employed, a suitable number of operation buttons may be provided. For example, during the production of ice cream and for cleaning the container C, the motor may be run at 110 rpm, and at the time of taking out the product it can be run at a higher velocity, e.g., 247 rpm.

The stock solution or emulsion is stirred by the revolving blades and becomes freezed gradually about the inner wall surface of the container. A first freezed portion of the stock is scraped off the container wall and sent downward by scrapers 11 and 11'. Whereas this portion of the stock tends to ascend along the container wall due to the centrifugal force caused by the revolving pusher blades 10, it will again be pressed downward by scrapers. During such cycle of falling and rising, the stock can be evenly intimately milled to become desirably creamy.

Milling of the stock solution and whipping of air into ice cream take place along the side edges of the grooved portion 18 of the blades 11 and 11' as illustrated in FIG. 4, and also along the tilted wall 19 of the blades 10 as shown in FIG. 5. The complex milling action made in the freezer of the invention in addition to agitation or mixing is highly effective in imparting to the product a desirable texture.

Upon completion of the ice cream production, the rotation velocity of the motor is raised and the outlet 21 is put open. The product ice cream is led to the opening 21 as assisted by the inclination of both the scrapers and the pushers, and taken out through the downwardly forwardly expanding outlet 21, rapidly with minimum flow resistance and with substantially no residue within the container.

Whereas I have described and illustrated a specific embodiment of the invention, the embodiment described in conjunction with several figures can be readily modified without departing from the concept of my present invention, and therefore the scope of my invention should not be understood to be limited to only the form as specifically disclosed and illustrated in the foregoing specification and accompanying drawings but is to be defined and limited only by the claims which follow.

I claim:

1. An ice cream freezer comprising:
    a refrigerated cylindrical container supported within a housing and opened at its upper end,
    said container having an integrally formed hollow cylinder extending upright through the central portion of its bottom wall up to near its open end, and having between said hollow cylinder and its inner wall a product outlet communicating to and opening at a side wall portion of said housing; and
    a revolving blade positioned within said container,
    said blade assembly including a rotating shaft inserted through the hollow cylinder and having a top and extending beyond the upper end of the cylinder, an upper hub rotatably supported at an upper end portion of the cylinder and drivingly connected with the top end of said rotating shaft, said upper hub having a threadably engageable closing cap and a pair of horizontally extending arms; a lower hub surrounding the hollow cylinder near the bottom of the container and connected to said horizontal arms through vertical stays, said lower hub having horizontally extending pusher blades; and a pair of scraper blades supported between the outer ends of said horizontal arms and the outer ends of said pusher blades and inclined toward the direction of rotation with respect to the generating line of said cylindrical container and frictionally engaging the inner wall surface of the container, each of said scraper blades having land portions and groove portions alternately formed at its outer surface, each groove portion having narrower and broader widths at its leading and trailing edges respectively.

2. The ice cream freezer as claimed in claim 1, wherein each of said pusher blades has a tilt wall tilted in the direction of rotation and a perpendicular triangle wall provided at its outer end.

3. The ice cream freezer as claimed in claim 2, wherein said tilt wall is tilted at about 30° with respect to horizon.

4. The ice cream freezer as claimed in claim 1, wherein said product outlet has a configuration capable of minimizing the flow resistance of the product ice cream.

5. An ice cream freezer comprising:
a refrigerated cylindrical container supported within a housing and opened at its upper end,
said container having an integrally formed hollow cylinder extending upright through the central portion of its bottom wall up to near its open upper end, and having between said hollow cylinder and its inner wall a product outlet communicating to and opening at a side wall portion of said housing; and
a revolving blade assembly positioned within said container;
said blade assembly including a rotating shaft inserted through the hollow cylinder and having a top and extending beyond the upper end of the cylinder, an upper hub rotatably supported at an upper end portion of the cylinder and drivingly connected with the top end of said rotating shaft, said upper hub having a threadably engageable closing cap and a pair of horizontally extending arms; a lower hub surrounding the hollow cylinder near the bottom of the container and connected to said horizontal arms through vertical stays, said lower hub having horizontally extending pusher blades; and a pair of scraper blades supported between the outer ends of said horizontal arms and the outer ends of said pusher blades inclined toward the direction of rotation with respect to the generating line of said cylindrical container and frictionally engaging the inner wall surface of the container, each of said pusher blades having a tilt wall tilted in the direction of rotation and a perpendicular triangle wall provided at its outer end.

6. The ice cream freezer as claimed in claim 5, wherein said tilt wall is tilted at about 30° with respect to horizon.

* * * * *